United States Patent [19]

Hall

[11] 4,304,676
[45] Dec. 8, 1981

[54] METHODS AND COMPOSITIONS FOR DISSOLVING SILICATES IN SUBTERRANEAN FORMATIONS

[75] Inventor: Bobby E. Hall, Duncan, Okla.
[73] Assignee: Halliburton Company, Duncan, Okla.
[21] Appl. No.: 129,449
[22] Filed: Mar. 11, 1980
[51] Int. Cl.³ .............................................. E21B 43/27
[52] U.S. Cl. .................................. 252/8.55 C; 166/307
[58] Field of Search .................... 252/8.55 C; 166/307

[56] References Cited
U.S. PATENT DOCUMENTS

| | | | |
|---|---|---|---|
| 3,794,117 | 2/1974 | Knox et al. ..................... | 252/8.55 X |
| 3,917,536 | 11/1975 | Crowe ............................... | 252/8.55 |
| 4,090,563 | 5/1978 | Lybarger et al. .............. | 252/8.55 X |
| 4,200,154 | 4/1980 | Tate ................................. | 252/8.55 X |

Primary Examiner—Herbert B. Guynn
Attorney, Agent, or Firm—John H. Tregoning; Thomas R. Weaver; Edward F. Sherer

[57] ABSTRACT

Hydrofluoric acid compositions and methods for dissolving siliceous materials in subterranean formations to stimulate the production of fluids therefrom are provided. The presence of aluminum in the compositions retards the reaction rates thereof to thereby enable deeper penetration of formations by the acid compositions.

40 Claims, No Drawings

METHODS AND COMPOSITIONS FOR DISSOLVING SILICATES IN SUBTERRANEAN FORMATIONS

This invention relates to the treatment of subterranean earth formations with acid for the purpose of increasing the porosity and permeability of the formations. It further relates to the use of acid solutions containing hydrofluoric acid in the treatment of silica and silicate-containing formations. The invention specifically deals with a composition and method for retarding the reaction rate of hydrofluoric acid on silica and silicates.

A variety of methods have been developed for treating subterranean earth formations for the purpose of stimulating the production of oil, gas and water therefrom. One such method which is commonly used features the injection of an acid treating fluid or composition into the subterranean formation to dissolve materials contained therein to thereby increase the porosity and permeability of the formation.

It is well known that hydrofluoric acid rapidly dissolves silica, clay and mixtures of silica and clay. Thus, hydrofluoric acid has been utilized in the treatment of subterranean formations containing silica and clay to increase the permeability of such formations whereby the ability of fluids, such as oil, gas and water, to flow through the thus treated formations is enhanced. This practice, known in the relevant art as sandstone acidizing, involves the use of hydrofluoric acid, sometimes in combination with and sometimes in series with other acids, to treat subterranean formations principally comprised of silica and clay.

Thus, in the treatment of sandstone and other formations containing silica and/or silicates, acid treating fluids containing hydrofluoric acid are commonly utilized in that hydrofluoric acid readily dissolves such materials. Silica, also known as silicon dioxide, occurs naturally as sand, quartz, flint and diatomite. A silicate is a compound containing silicon, oxygen and one or more metals with or without hydrogen. Clay is a species of silicate commonly found in subterranean earth formations associated with the production of oil, gas and water. Other silicates include asbestos, talc, feldspar, mica and others. For the purpose of this invention, the term "siliceous" is used to mean silica and/or silicate-containing materials, such as for example sandstone.

A problem associated with the use of treating fluids or compositions containing hydrofluoric acid in treating a siliceous formation is that the hydrofluoric acid reacts so rapidly with the siliceous materials in the formation that it becomes spent before penetrating very deeply into the formation. Consequently, the desired result of increasing the porosity and permeability of the formation is limited to areas closely adjacent the well bore. A method and composition for retarding the reaction rate of hydrofluoric acid on siliceous material is thus required, and is provided by this invention.

The present invention provides an improved acid composition containing hydrofluoric acid and methods for using the composition to dissolve siliceous materials in subterranean formations. The invention operates to retard the reaction rate of the composition with siliceous materials whereby increased penetration of a treated formation results before the composition becomes spent.

The acid composition of this invention for dissolving siliceous materials is an aqueous acidic solution having a pH value of no more than about 2, comprised of at least one mineral acid, at least one fluoride compound which is a source of hydrofluoric acid in the acidic environment, and an aluminum compound soluble in the mineral acid, wherein the aluminum compound, upon dissolution in the acid solution, produces aluminum ions having a plus 3 valence.

It is believed that aluminum III ions from the aluminum compound form aluminum fluoride complexes which retard the formation of hydrofluoric acid in the composition. It is further believed that as hydrofluoric acid in the composition reacts with siliceous material and becomes spent, a hydrolysis reaction in the acid media occurs between water and the aluminum fluoride complex to replace the spent hydrofluoric acid. Thus, the presence of aluminum III ions in the aqueous hydrofluoric acid solution forms aluminum fluoride to thereby retard the reaction rate of hydrofluoric acid with siliceous material by controlling the quantity of hydrofluoric acid available for reaction.

Any compound containing aluminum which is soluble in a solution of a mineral acid to yield aluminum III ions can be utilized in accordance with the present invention. Such compounds are preferably those represented by the general formula

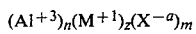

$$(Al^{+3})_n(M^{+1})_z(X^{-a})_m$$

and their hydrates; wherein: $3n+z=am$; the anion; X, is derived from a mineral acid, an organic acid or is an hydroxyl ($OH^-$); M is hydrogen (H) or ammonium ($NH_4$); and z is 0 or 1. Preferred mineral acid anions include sulfate ($SO_4^{-2}$), phosphate ($PO_4^{-3}$), nitrate ($NO_3^{-1}$), chloride ($Cl^{-1}$), bromide ($Br^{-1}$) and fluoride ($F^{-1}$). Preferred organic acid anions include formate ($HCOO^{-1}$), acetate ($CH_3COO^{-1}$), and citrate ($C_6H_5O_7^{-3}$).

Examples of acid soluble aluminum compounds which are particularly suitable for use in accordance with the present invention are aluminum chloride, aluminum nitrate, aluminum sulfate, aluminum hydroxide, aluminum ammonium sulfate, aluminum ammonium chloride, aluminum fluoride, and mixtures thereof, the hydrates of such salts and mixtures of such salts and hydrates. Aluminum chloride hydrate ($AlCl_3 \cdot 6H_2O$) is the currently most preferred aluminum compound in that it is readily available and relatively inexpensive.

Some aluminum compounds which contain metals, such as potassium and sodium, can retard the reaction of hydrofluoric acid with silicates; however, these compounds produce precipitates with the dissolved silicates and the sodium or potassium. Examples of such compounds are aluminum potassium sulfate and aluminum sulfate sodium sulfate. Since such compounds have the potential to produce more harm than good, they are not preferred for use in the treatment of subterranean formations where the desired result is increase of porosity and permeability.

The quantities of aluminum compound and fluoride compound present in the composition are determined on the basis of the quantities of aluminum II ion and fluoride ion provided by the respective sources of each. In this connection, the ratio of the fluoride ion concentration, expressed as gram-moles of fluoride ion per liter, to the aluminum III ion concentration, expressed as gram-moles of aluminum III ion per liter, required to obtain the desired retarded hydrofluoric acid is in the range of from about 1 to 1 to about 6 to 1. This ratio, hereinafter referred to as the ion concentration ratio, when it is within the one to six range referred to above, expressed the relative concentrations of the fluoride ion and aluminum ion wherein retardation of hydrofluoric acid with respect to siliceous material occurs. With respect to the lower end of the range, i.e., 1:1, it is believed that the formation of hydrofluoric acid, as described previously, can not even commence until the ratio is at least equal to 1:1. With respect to the upper end of the range, i.e. 6:1, it is believed that no retardation occurs until the fluoride ion concentration is reduced, by spending of active hydrofluoric acid, by an amount sufficient to produce a ratio of no more than 6:1. Accordingly, the ion concentration ratio useful herein is in the range of 1 to 6 and preferably 2 to 5 gram-moles of fluoride ion per liter per 1 gram-mole of aluminum III ion per liter. The most preferred ion concentration ratio is four.

A typical composition of the present invention for dissolving siliceous materials in well treating processes is accordingly comprised of water; a fluoride compound, which is a source of hydrofluoric acid; a mineral acid; and an acid soluble aluminum compound, as previously defined, present in the composition in an amount sufficient to produce a ratio of fluoride ions to aluminum III ions in the range of from about 1 to 1 to about 6 to 1 wherein the pH of the composition is no more than 2.

When calculating the quantities of fluoride compound and aluminum compound to be used, such calculations being based on part upon the above mentioned ion concentration ratio, it should be noted that the concentration of fluoride ion in the acid composition should be at least equal to about 0.05 gram-moles of fluoride ($F^{-1}$) ion per liter in order to produce a sufficient quantity of hydrofluoric acid to effectively dissolve siliceous materials. Accordingly, the minimum effective amount of fluoride ion, for purposes of this invention, is defined as 0.05 gram-moles of fluoride ion per liter of solution. There is no known maximum effective amount of fluoride ion as far as dissolution of siliceous material is concerned, or as far as retardation of hydrofluoric acid in accordance with this invention is concerned. However, owing to the hazardous nature of hydrofluoric acid, it is believed, for safety considerations, that a practical upper limit, for field operations, is about 6 gram-moles of fluoride ion per liter of solution. Thus, for well operations, the concentration of fluoride ion useful herein is in the range of from about 0.05 to about 6, and preferably from about 0.25 to about 3, and still more preferably from about 0.5 to about 1.5 gram-moles of fluoride ($F^{-1}$) ion per liter of solution. Accordingly, the required quantities of fluoride compound and aluminum compound to be used herein can be readily determined by application of well known chemical calculation procedures wherein the above recited ion concentration ratio and fluoride ion concentration are used in the calculations.

Fluoride compounds useful herein which are suitable sources of hydrofluoric acid include ammonium fluoride ($NH_4F$), ammonium bifluoride ($NH_4F \cdot HF$), hydrogen fluoride (HF), aluminum fluoride and mixtures thereof.

Mineral acids which can be mixed with the fluoride component include hydrochloric acid, nitric acid, sulfuric acid and mixtures thereof.

The acid composition of this invention can also include at least one organic acid selected from formic acid, acetic acid and citric acid and mixtures thereof to obtain other properties ordinarily desirable in acid compositions.

Aluminum fluoride can be used herein to simultaneously satisfy the aluminum compound feature as well as the fluoride compound feature of this invention. Since aluminum fluoride, upon dissolution in the mineral acid, produces an ion concentration ratio of three, additional fluoride ion can be supplied from a second fluoride compound if a higher ion concentration ratio is desired.

Sufficient mineral acid is required in the acid composition of this invention to produce in the composition a pH value of no greater than two. A mineral acid concentration of about 0.1 weight percent mineral acid by total weight of acid composition will provide the requisite pH value. However, as is well known, acid treating operations of subterranean earth formations ordinarily utilize acid compositions having acid concentrations greater than 0.1 percent. The extent of such concentrations are often limited by field handling problems, safety considerations, and commercial availability. Thus, the actual pH of acid compositions utilized is ordinarily much less than 2 and pH is very often expressed in negative values. In view of the above comments, it is believed that practical acid concentrations for use herein are in the range of from about 0.1 to about 30, preferably from about 5 to about 20 and still more preferably from about 10 to about 15 percent mineral acid by weight of acid composition. It must be stressed, however, that the only real limitation on operability with respect to acidity is the upper pH limit of 2 which can be achieved by an acid concentration of about 0.1 percent acid by weight of composition.

A more preferred composition is comprised of water, hydrofluoric acid, a second acid selected from the group consisting of hydrochloric acid, sulfuric acid, nitric acid and mixtures of such acids present in the composition in an amount in the range of from about 0.1 to about 30% by weight of the composition, and an aqueous acid soluble aluminum compound selected from the group consisting of aluminum chloride, aluminum nitrate, aluminum sulfate, aluminum hydroxide, aluminum ammonium sulfate, aluminum ammonium chloride, aluminum fluoride, the hydrates of such compounds and mixtures of such compounds and hydrates wherein the ion concentration ratio is in the range of from about 1 to 6 and the concentration of fluoride ion is in the range of from about 0.05 to about 6 gram-moles of fluoride ion per liter of solution. Hydrochloric acid is the most preferred of the second acids.

The most preferred composition of this invention is comprised of water, hydrofluoric acid, aluminum chloride hydrate and hydrochloric acid present in the composition in an amount of about 15% by weight of the composition wherein the ion concentration ratio of fluoride to aluminum III is 4 to 1 and the fluoride ion concentration is 0.75 gram-moles fluoride ion per liter of solution.

In preparing the acid compositions of this invention, the order of mixing of the components is not critical. However, a preferred technique is to dissolve the aluminum compound(s) utilized in the hydrofluoric acid, followed by the addition of the second acid or acids used, followed by the addition of water to form a composition of desired acid concentration. Instead of liquid hydrofluoric acid which is difficult to handle, a solid material such as ammonium bifluoride can be utilized to form an aqueous solution of hydrofluoric acid. In this case, it is preferred that to the mineral acid there be added either the aluminum compound or the fluoride compound followed by the addition of either the fluoride compound or the aluminum compound and lastly the addition of water to form an acid composition of desired strength.

Once formed, the compositions of the present invention have long shelf lives, i.e., very little undesirable precipitates are formed while the compositions are stored, the compositions are easily prepared and the compositions can be pumped into a subterranean formation to be treated in a single stage, i.e., the compositions do not require the introduction of other fluids into the formation prior to or after the introduction of the compositions. The reaction rates of the compositions with siliceous materials are retarded by a factor of 2 or 3 times as compared to prior acid compositions containing hydrofluoric acid and, therefore, can achieve much deeper penetration into a formation being treated before becoming spent as compared to prior compositions.

In using a composition of this invention for stimulating the production of desired fluids from subterranean formations, the composition is prepared either at the time the treatment is to be carried out or prior to such time. When the treatment is carried out, the composition is simply pumped into the formation to be treated using conventional methods and equipment and as the composition contacts the formation, siliceous and other materials contained in the formation are dissolved. After the composition becomes spent, it is recovered from the formation resulting in an increase in the porosity and permeability of the formation adjacent the well bore as well as in areas away from the well bore. The increase in the porosity and permeability of the formation increases the productivity of desired fluids therefrom.

In sandstone formations, clays are the most damaging from the standpoint of preventing the production of desired fluids therefrom. However, since the compositions of the present invention are retarded, they dissolve more of the clays and less of the sand and other nondamaging materials in the formation thereby achieving superior results as compared to heretofore used nonretarded acid compositions.

The acid composition of this invention can be utilized in various ways for treating subterranean formations for the purpose of dissolving siliceous materials. In one method, the composition can be placed in contact with the desired formation by merely introducing it into the well bore and permitting it to traverse the bore until it contacts the formation. The composition is thereafter permitted to remain in contact until it spends then it can be recovered.

According to another method of use, the acid composition of this invention can be preceded by a preflush fluid and followed by an overflush fluid wherein each of the preflush fluid and the overflush fluid and the acid composition of this invention can contain additives ordinarily employed in acid treating compositions, such as for example nonemulsifying agents, corrosion inhibitors, clay stabilizers, surface tension reducing agents, and the like.

In one typical treatment, the subterranean formation is first contacted with a preflush fluid, such as 5 to 15% hydrochloric acid. This acid preflush can also include an organic acid, such as formic and acetic acid. The prefluish fluid can be followed by a conventional mud acid, which ordinarily comprises 3% hydrofluoric acid and 12% hydrochloric acid, which is then followed by the acid composition of this invention. Following this an overflush fluid can be used. An overflush can include any one or all of the following: hydrochloric acid, ammonium chloride, diesel oil, kerosene, lease crude, nitrogen gas or carbon dioxide.

The following examples are provided to facilitate a clear understanding of the methods and compositions of the present invention.

EXAMPLE 1

There are various techniques, known by those persons skilled in the art, for calculating or otherwise preparing treating solutions. One technique for estimating the quantities of materials required to prepare the acid composition of this invention is provided in connection with the sample problem set out below.

SAMPLE CALCULATION

Wanted: A 10,000 gallon volume of the acid composition of this invention containing 15 percent by weight hydrochloric acid, ammonium bifluoride and aluminum chloride wherein the fluoride ion concentration is 1 gram-mole/liter and the ratio of the fluoride ion concentration to the aluminum III ion concentration is 4.

a. How many pounds of ammonium bifluoride and aluminum chloride are required?
b. How many gallons of 20° Bé hydrochloric acid are required?
c. How many gallons of water are required?

---

Pounds of Ammonium Bifluoride (ABF):

1. Molecular Weight $NH_4F \cdot HF = 57.05$
2. lb ABF =

$$\frac{(1 \text{ lb ABF})}{(454 \text{ gms ABF})} \times \frac{(57.05 \text{ gms ABF})}{(\text{gm-mole ABF})} \times \frac{(1 \text{ gm-mole ABF})}{(2 \text{ gm-mole } F^{-1})}$$

$$\frac{(1 \text{ gm-mole } F^{-1})}{(\text{liter})} \times \frac{(1 \text{ liter})}{(0.2642 \text{ gal})} \times \frac{(10,000 \text{ gallons})}{}$$

lb ABF = $2378.14$

---

Pounds of Aluminum Chloride:

1. Molecular Weight $AlCl_3 = 133.35$
2. lb $AlCl_3$ =

$$\frac{(1 \text{ lb } AlCl_3)}{(454 \text{ gms } AlCl_3)} \times \frac{(133.35 \text{ gms } AlCl_3)}{(\text{gm-mole } AlCl_3)}$$

$$\frac{(1 \text{ gm-mole } AlCl_3)}{(1 \text{ gm-mole } Al^{+3})} \times \frac{(1 \text{ gm-mole } Al^{+3}/1)}{(4 \text{ gm-mole } F^{-1}/1)}$$

$$\frac{(1 \text{ gm-mole } F^{-1}/1)}{} \times \frac{(1 \text{ liter})}{(0.2642 \text{ gal})} \times \frac{(10,000 \text{ gal})}{}$$

lb $AlCl_3$ = $2779.36$

---

Gallons 20° Bé Hydrochloric Acid:

1. Density of 15% HCl @ 60° F. = 1.075 gm/ml
2. lb HCl =

$$\frac{(0.15 \text{ lb HCl})}{(\text{lb soln})} \times \frac{(1 \text{ lb soln})}{(454 \text{ gm soln})} \times \frac{(1.075 \text{ gm soln})}{(1 \text{ ml soln})}$$

$$\frac{(1000 \text{ ml soln})}{(1 \text{ liter soln})} \times \frac{(1 \text{ liter soln})}{(0.2642 \text{ gal soln})} \times \frac{(10,000 \text{ gal soln})}{}$$

lb HCl = $13443.46$

3. Density of 20° Bé HCl @ 60° F. = 1.16 gm/ml
4. Concentration of 20° Bé HCl = 31.45%

-continued

Gallons 20° Be Hydrochloric Acid:

Gallons 20° Bé Hydrochloric acid solution required for 13443.46 lb HCl.

5. Gal soln = $\frac{(0.2642 \text{ gal soln})}{(1 \text{ liter soln})} \times \frac{(1 \text{ liter soln})}{(1000 \text{ ml soln})} \times \frac{(1 \text{ ml soln})}{(1.16 \text{ gms soln})}$
$\times \frac{(454 \text{ gms soln})}{(1 \text{ lb soln})} \times \frac{(1 \text{ lb soln})}{(0.3145 \text{ lb HCl})} \times \frac{(13443.46 \text{ lb HCl})}{}$ Gallons 20° Bé HCl = 4419.99

Gallons Water 1. lbs Acid Solution = $\frac{(100 \text{ lb soln})}{(15 \text{ lb HCl})} \times \frac{(13443.46 \text{ lb HCl})}{}$
  = 89623.07

2. lbs 20° Be HCl = $\frac{(1 \text{ lb})}{(454 \text{ gms})} \times \frac{(1.16 \text{ gms})}{(\text{ml})} \times \frac{(1000 \text{ ml})}{(\text{liter})}$
$\times \frac{(1 \text{ liter})}{(0.2642 \text{ gal})} \times \frac{(4419.99 \text{ gal})}{}$

= 42745.52

3. lbs H$_2$O = lbs solution − lbs of remaining ingredients
  = 89623.07 − (42745.52 + 2378.14 + 2779.36)
  = 41720.05

4. Density H$_2$O @ 60° F. = 0.999 gm/ml

5. Gal H$_2$O = $\frac{(0.2642 \text{ gal})}{(\text{liter})} \times \frac{(1 \text{ liter})}{(1000 \text{ ml})} \times \frac{(1 \text{ ml})}{(0.999 \text{ gm})}$
$\times \frac{(454 \text{ gm})}{(\text{lb})} \times \frac{(41720.05 \text{ lb})}{}$

= 5009.2

EXAMPLE 2

A composition of the present invention containing water, 3% by weight hydrofluoric acid, 1.5 moles $F^{-1}$/liter, 15% by weight hydrochloric acid and 12% by weight aluminum chloride hydrate, 0.5 moles $Al^{+3}$/liter, is prepared. A 25 cc sample of the acid composition is reacted with 3 grams of silica flour at 150° F., and after one hour, the quantity of silica flour dissolved by the composition is determined by atomic adsorption quantitative analysis of SiO$_2$ in solution which is reported in milligrams per liter. The results of this test show that the composition dissolves 3200 parts per million silica flour in one hour.

An acid composition containing water, 3% by weight hydrofluoric acid and 15% by weight hydrochloric acid is prepared and the test procedure described above repeated. Such composition which does not contain aluminum III ions dissolves 10,000 parts per million of silica flour in one hour.

Thus, the presence of aluminum III in the composition of the present invention brings about a 3-fold retardation in reaction rate with silica flour.

EXAMPLE 3

Acid compositions comprised of water, 1.5% by weight hydrofluoric acid, 0.75 moles $F^{-1}$/liter, and 15% by weight hydrochloric acid are prepared. Various aluminum salts which dissolve in the acid to yield aluminum III ions are combined with the acid composition in various amounts to thereby produce acid compositions of this invention; 25 cc samples of the resulting compositions are each reacted with 3 grams of silica flour for time periods of one hour at 150° F. The quantities of silica flour dissolved by the samples are compared to the quantity of silica flour dissolved by an acid composition containing 1.5% by weight hydrofluoric acid and 15% by weight hydrochloric acid which does not contain aluminum III ions. The results of these tests are shown in Table I below.

TABLE I

SILICATE REACTION RATE RETARDATION USING VARIOUS ALUMINUM SALTS

| Aluminum Salt Used | Quantity of Aluminum Salt, Grams per 25 cc of Acid Composition | Mole-Ratio $F^{-1}$/$Al^{+3}$ | Silica Flour Dissolved ppm |
|---|---|---|---|
| None | 0 | — | 5,650 |
| Aluminum Chloride Hydrate (AlCl$_3$ . 6H$_2$O) | 1.25 | 3.6:1 | 2,960 |
| Aluminum Nitrate Hydrate (Al(NO$_3$)$_3$ . 9H$_2$O) | 1.95 | 3.6:1 | 2,290 |
| Aluminum Sulfate Hydrate (Al$_2$(SO$_4$)$_3$ . 16H$_2$O) | 1.63 | 3.6:1 | 2,170 |
| Aluminum Hydroxide | 0.4 | 3.7:1 | 2,780 |
| Aluminum Ammonium Sulfate Hydrate (AlNH$_4$(SO$_4$)$_2$ . 12H$_2$O) | 2.35 | 3.6:1 | 2,840 |
| Aluminum Fluoride Hydrate[1] (Al$_2$F$_6$ . XH$_2$O) | 0.71 | 3.6:1 | 2,110 |
| Aluminum Fluoride[1] (AlF$_3$ . H$_2$O) | 0.53 | 3.6:1 | 2,170 |
| Aluminum Potassium Sulfate Hydrate[2] (AlK(SO$_4$)$_2$ . 12H$_2$O) | 2.45 | 3.6:1 | 171 |
| Aluminum Sulfate Sodium Sulfate Hydrate[2] (Al$_2$(SO$_4$)$_3$Na$_2$SO$_4$ . 24H$_2$O) | 4.73 | 3.6:1 | 551 |

[1]Acid compositions containing about 0.4% by weight HF used with these salts because salts contribute 3 moles F per mole of Al.
[2]Dissolved silica precipitated by sodium or potassium.

From Table I it can be seen that the various aluminum salts tested bring about a significant retardation of the reaction rate of the hydrofluoric acid composition with silica flour as compared to an acid composition without aluminum.

EXAMPLE 4

Acid compositions of this invention are prepared containing 15% by weight hydrochloric acid and various quantities of hydrofluoric acid and aluminum chloride hydrate whereby a 1:4 mole ratio of aluminum to fluoride is maintained. Samples of the compositions are stored for 6 and 72 hours at 72° F. and for 72 hours at 150° F. after which the quantities of precipitate in the samples are determined. The results of these tests are shown in Table II below.

TABLE II

PRECIPITATE FORMATION IN VARIOUS ACID COMPOSITIONS DURING STORAGE

| % By Weight Hydrofluoric Acid In Composition | % By Weight Aluminum Chloride Hydrate in Composition | Quantity of Precipitated Solids Grams per 100 cc Composition | | |
|---|---|---|---|---|
| | | 72° F. 6 Hrs | 72° F. 72 Hrs | 150° F. 72 Hrs |
| 0.5 | 1.67 | 0.055 | 0.02 | 0 |
| 1.0 | 3.33 | 0.51 | 0.22 | 0 |
| 1.5 | 5.0 | 1.08 | 0.75 | 0.02 |
| 2.0 | 6.67 | — | 1.41 | — |
| 2.5 | 8.33 | — | 2.54 | — |
| 3.0 | 10.0 | — | 3.44 | — |

From Table II it can be seen that the compositions tested have good shelf lives in that relatively little precipitate is formed during storage.

EXAMPLE 5

An acid composition of the present invention containing 1.5% by weight hydrofluoric acid, 0.75 moles $F^{-1}$/liter, 5% by weight aluminum chloride hydrate, 0.2 moles $Al^{+3}$/liter, and 15% by weight hydrochloric acid is prepared. 25 cc samples of the acid composition are reacted with 3 grams of silica flour for one hour each at a reaction temperature of 150° F. after first having been aged for various time periods at 72° F. The results of these tests are shown in Table III below.

TABLE III
EFFECT OF ACID COMPOSITION AGING ON SILICATE REACTION RATE RETARDATION

| Elapsed Time From Preparation of Acid Composition, Hrs. | Silica Flour Dissolved ppm |
|---|---|
| 0 | 3,190 |
| 1 | 3,075 |
| 2 | 3,155 |
| 4 | 3,165 |
| 6 | 2,875 |
| 24 | 2,870 |
| 48 | 2,970 |
| 72 | 3,185 |
| 144 | 2,900 |

From Table III it can be seen that aging of the acid compositions of this invention has little effect on the retardation of the composition reaction rate with silicates.

EXAMPLE 6

An acid composition of the present invention containing 1.5% by weight hydrofluoric acid, 0.75 moles $F^{-1}$/liter, 5% by weight aluminum chloride hydrate, 0.2 moles $Al^{+3}$/liter, and 15% by weight hydrochloric acid is prepared. 25 cc samples of the acid composition are each reacted with 3 grams of silica flour at various temperatures for various times.

An acid composition containing 1.5% hydrofluoric acid and 15% hydrochloric acid not containing aluminum chloride hydrate is also prepared and 25 cc samples of such composition are each reacted with 3 grams of silica flour at various temperatures and for various times. The results of these tests are compared in Table IV below.

TABLE IV
EFFECT OF TEMPERATURE ON REACTION RATE RETARDATION

| | Silica Flour Dissolved ppm | | | | | | | |
|---|---|---|---|---|---|---|---|---|
| | Acid Composition Without Aluminum Chloride Hydrate | | | | Acid Composition With Aluminum Chloride Hydrate | | | |
| Time of Reaction, Minutes | 72° F. | 100° F. | 150° F. | 200° F. | 72° F. | 100° F. | 150° F. | 200° F. |
| 10 | 2000 | 2400 | 3570 | 3800 | 1500 | 1640 | 1680 | 2100 |
| 20 | 2300 | 2900 | 4130 | 4540 | 1750 | 1790 | 2080 | 2530 |
| 30 | 3300 | 4000 | 4470 | 4780 | 1970 | 1970 | 2670 | 2920 |
| 60 | 6300 | 5100 | 5650 | 6775 | 2000 | 2390 | 2960 | 3620 |
| 360 | 6510 | 7620 | 7680 | 7540 | — | — | 5640 | — |
| 1440 | 7000 | 8680 | 7150 | 7490 | 3850 | 4470 | 5500 | 6820 |

From Table IV it can be seen that the acid compositions of the present invention are effectively retarded over a broad temperature range.

EXAMPLE 7

An acid composition of the present invention containing 1.5% by weight hydrofluoric acid, 0.75 moles $F^{-1}$/liter, 5% by weight aluminum chloride hydrate, 0.2 moles $Al^{+3}$/liter, and 15% by weight hydrochloric acid is prepared. 25 cc samples of such composition are reacted with glass slides, Oklahoma No. 1 sand and various quantities of silica flour to determine the effect of surface area on the reaction rate of the compositions.

A composition containing water, 1.5% by weight hydrofluoric acid and 15% by weight hydrochloric acid not containing aluminum chloride hydrate is prepared and the above-described procedure repeated. A comparison of the results of these tests is set forth in Table V below.

TABLE V
EFFECT OF SURFACE AREA ON ACID COMPOSITION SILICATE REACTION RATE RETARDATION

| Silicate Used | Quantity of Silicate, Grams | Surface Area of Silicate Exposed To Acid Composition Contact, CM². | Silicate Dissolved in Acid Composition, ppm, 150° F. | | | | | | | |
|---|---|---|---|---|---|---|---|---|---|---|
| | | | Acid Composition Without Aluminum Chloride Hydrate | | | | Acid Composition With Aluminum Chloride Hydrate | | | |
| | | | 10 Min. | 20 Min. | 60 Min. | 1440 Min. | 10 Min. | 20 Min. | 60 Min. | 1440 Min. |
| Glass Slide | — | 37.5 | 804 | 1690 | 4370 | 8870 | 393 | 817 | 2280 | 6530 |
| Okla. #1 Sand | 1 | 183 | 166 | 1910 | 2870 | 4520 | 94 | 129 | 1240 | 1550 |
| Silica Flour | 1 | 2770 | 1830 | 2690 | 3965 | 7110 | 71 | 98 | 1550 | 4630 |
| Silica Flour | 3 | 11,310 | 3570 | 5200 | 5650 | 7150 | 1680 | 2080 | 2960 | 5500 |
| Silica Flour | 6 | 22,620 | 4720 | 6270 | 7120 | 8280 | 2820 | 3510 | 3990 | 6450 |
| Silica Flour | 12 | 45,240 | 5890 | 7380 | 8070 | 7760 | 3940 | 4330 | 4990 | 5260 |
| Silica Flour | 24 | 90,480 | 8120 | 7700 | 8630 | 8970 | 5410 | 5560 | 6130 | 6040 |

From Table V it can be seen that increasing the silicate surface area to acid composition volume ratio increases the quantity of silicates dissolved, but the retardation effect of the aluminum chloride hydrate in the compositions is consistent.

EXAMPLE 8

Acid compositions of this invention are prepared using liquid hydrofluoric acid and solid ammonium bifluoride, each composition containing 1.5% by weight hydrofluoric acid, 0.75 moles $F^{-1}$/liter, 5% by weight aluminum chloride hydrate, 0.2 moles $Al^{+3}$/liter, and 15% hydrochloric acid. Similar compositions are prepared which do not contain the aluminum chloride hydrate. 25 cc samples of the various compositions are each reacted with 3 grams of silica flour for various time periods, and the quantity of silica flour dissolved by each determined. The results of these tests are shown in Table VI below.

TABLE VI

COMPARISON OF SILICATE REACTION RATE RETARDATION OF ACID COMPOSITIONS FORMED WITH SOLID AMMONIUM BIFLUORIDE AND LIQUID HYDROFLUORIC ACID

| | Silica Flour Dissolved, ppm, 150° F. | | | |
|---|---|---|---|---|
| Time of Reaction Mins. | Acid Composition Without Aluminum Chloride Hydrate | | Acid Composition With Aluminum Chloride Hydrate | |
| | Formed With Solid Ammonium Bifluoride | Formed With Liquid Hydrofluoric Acid | Formed With Solid Ammonium Bifluoride | Formed With Liquid Hydrofluoric Acid |
| 10 | 3350 | 3570 | 1320 | 1680 |
| 20 | 3980 | 4130 | 1850 | 2080 |
| 30 | 4710 | 4470 | 1980 | 2670 |
| 60 | 4990 | 5650 | 2670 | 2960 |
| 360 | 6400 | 7680 | 4220 | 5640 |
| 1440 | 8060 | 7150 | 5030 | 5500 |

From Table VI it can be seen that acid compositions of this invention prepared from ammonium bifluoride and liquid hydrofluoric acid are both effectively retarded.

This invention is not limited to the above described specific embodiments thereof; it must be understood therefore that the detail involved in the descriptions of the specific embodiments is presented for the purpose of illustration only, and that reasonable variations and modifications, which will be apparent to those skilled in the art, can be made in this invention without departing from the spirit or scope thereof.

Having thus described the invention, that which is claimed is:

1. An aqueous acid composition for dissolving siliceous materials said composition having a pH value of no more than 2 and being comprised of at least one mineral acid, at least one fluoride compound which is a source of hydrofluoric acid in said mineral acid, and an aluminum compound, soluble in said mineral acid, which upon dissolution in said mineral acid produces aluminum III ions, wherein said fluoride compound is present in said composition in an amount sufficient to produce a fluoride ion concentration of at least 0.05 gram-moles of fluoride per liter of solution and said aluminum compound is present in said composition to produce a molar ratio of fluoride ions to said aluminum III ions of from about 1 to 1 to about 6 to 1.

2. The acid composition of claim 1 wherein said aluminum compound is represented by the general formula

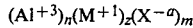

the hydrates of such compounds and mixtures thereof wherein: X is selected from the group consisting of anions derived from mineral acids, anions derived from organic acids, an hydroxyl group and mixtures thereof; M is selected from hydrogen and ammonium; z is 0 or 1; and $3n+z=am$.

3. The acid composition of claim 1 wherein X is selected from the group consisting of hydroxyl, sulfate, phosphate, nitrate, chloride, bromide, fluoride, formate, acetate and citrate.

4. An aqueous acid composition for dissolving siliceous materials said composition having a pH value of no more than 2 and being comprised of at least one mineral acid, at least one fluoride compound which is a source of hydrofluoric acid in said mineral acid, and an aluminum compound soluble in said mineral acid which produces aluminum III ions upon dissolution in said mineral acid, wherein said fluoride compound is present in said composition in an amount sufficient to produce a fluoride ion concentration in the range of from about 0.05 to about 6 gram-moles of fluoride ion per liter of solution and said aluminum compound is present in said composition in an amount sufficient to produce an ion concentration molar ratio of said fluoride ions to said aluminum III ions in the range of from about 1 to 1 to about 6 to 1.

5. The acid composition of claim 4 wherein said aluminum compound is selected from the group consisting of aluminum chloride, aluminum nitrate, aluminum sulfate, aluminum hydroxide, aluminum ammonium sulfate, aluminum ammonium chloride, aluminum fluoride, and mixtures thereof, the hydrates of such salts and mixtures of such salts and hydrates.

6. The acid composition of claim 5 wherein said fluoride compound is selected from the group consisting of ammonium fluoride (NH$_4$F), ammonium bifluoride (NH$_4$F·HF), hydrogen fluoride (HF), aluminum fluoride and mixtures thereof.

7. The acid composition of claim 6 wherein said mineral acid is selected from the group consisting of hydrochloric acid, nitric acid, sulfuric acid and mixtures thereof.

8. The acid composition of claim 7 wherein said fluoride ion concentration is in the range of from about 0.25 to about 3 gram-moles of fluoride ion per liter and said ion concentration molar ratio is in the range of from about 2 to 1 to about 5 to 1.

9. The acid composition of claim 8 wherein said mineral acid is present in an amount in the range of from about 0.1 to about 30 percent by weight of said composition.

10. The acid composition of claim 9 wherein said fluoride compound and said aluminum compound is aluminum fluoride.

11. The acid composition of claim 9 wherein said fluoride ion concentration is in the range of from about 0.5 to about 1.5 gram-moles of fluoride ion per liter and said mineral acid is present in an amount in the range of from about 5 to about 20 percent by weight.

12. An acid composition for dissolving siliceous material comprised of water; hydrofluoric acid; a mineral acid selected from the group consisting of hydrochloric acid, sulfuric acid, nitric acid and mixtures thereof present in said composition in an amount in the range of from about 0.1 to about 30 percent by weight; an aluminum compound selected from the group consisting of aluminum chloride, aluminum nitrate, aluminum sulfate, aluminum hydroxide, aluminum ammonium sulfate, aluminum ammonium chloride, aluminum fluoride, the hydrates thereof and mixtures thereof; wherein the fluoride ion concentration is in the range of from about 0.05 to about 6 gram-moles per liter and the ion concentration molar ratio of said fluoride ion to aluminum ion is in the range of 1 to 1 to 6 to 1.

13. The acid composition of claim 12 wherein said mineral acid is hydrochloric acid and said aluminum compound is aluminum chloride hydrate and wherein said mineral acid is present in an amount of about 15 percent by weight, said fluoride ion concentration is about 0.75 gram-moles per liter and said ion concentration molar ratio is about 4 to 1.

14. A method of retarding the reaction rate of an aqueous acid composition said composition having a pH value of no more than 2 and containing a mineral acid and hydrofluoric acid with a siliceous material comprising adding to said aqueous acid composition an aluminum compound soluble in said mineral acid to produce aluminum III ions prior to reacting said composition with said siliceous material, wherein said hydrofluoric acid is present in said composition in an amount sufficient to produce a fluoride ion concentration of at least 0.05 gram-moles of fluoride per liter of solution and said aluminum compound is present in said composition to produce a molar ratio of fluoride ions to said aluminum III ions of from about 1 to 1 to about 6 to 1.

15. The method of claim 14 wherein said aluminum compound is selected from the group consisting of aluminum chloride, aluminum nitrate, aluminum sulfate, aluminum hydroxide, aluminum ammonium sulfate, aluminum ammonium chloride, aluminum fluoride, and mixtures thereof, the hydrates of such salts and mixtures of such salts and hydrates.

16. A method of acidizing a subterranean formation containing siliceous materials to stimulate the production of desired fluids therefrom comprising contacting said formation with an aqueous acid composition having a pH value of no more than 2 and being comprised of at least one mineral acid, at least one fluoride compound which is a source of hydrofluoric acid in said mineral acid, and an aluminum compound, soluble in said mineral acid, which upon dissolution in said mineral acid produces aluminum III ions, wherein said fluoride compound is present in said composition in an amount sufficient to produce a fluoride ion concentration of at least 0.05 gram-moles of fluoride per liter of solution and said aluminum compound is present in said composition to produce a molar ratio of fluoride ions to said aluminum III ions of from about 1 to 1 to about 6 to 1.

17. The method of claim 16 wherein said aluminum compound is represented by the general formula

$$(Al^{+3})_n(M^{+1})_z(X^{-a})_m$$

the hydrates of such compounds and mixtures thereof wherein: X is selected from the group consisting of anions derived from mineral acids, anions derived from organic acids, an hydroxyl group and mixtures thereof; M is selected from hydrogen and ammonium; z is 0 or 1; and $3n+z=am$.

18. The method of claim 17 wherein X is selected from the group consisting of hydroxyl, sulfate, phosphate, nitrate, chloride, bromide, fluoride, formate, acetate and citrate.

19. A method of acidizing a subterranean formation containing siliceous materials to stimulate the production of desired fluids therefrom comprising contacting said formation with an aqueous acid composition comprised of water; hydrofluoric acid; a mineral acid selected from the group consisting of hydrochloric acid, sulfuric acid, nitric acid and mixtures thereof present in said composition in an amount in the range of from about 0.1 to about 30 percent by weight; an aluminum compound selected from the group consisting of aluminum chloride, aluminum nitrate, aluminum sulfate, aluminum hydroxide, aluminum ammonium sulfate, aluminum ammonium chloride, aluminum fluoride, the hydrates thereof and mixtures thereof; wherein the fluoride ion concentration is in the range of from about 0.05 to about 6 gram-moles per liter and the ion concentration molar ratio of said fluoride ion to aluminum ion is in the range of 1 to 1 to 6 to 1.

20. The method of claim 19 wherein said mineral acid is hydrochloric acid and said aluminum compound is aluminum chloride hydrate and wherein said mineral acid is present in an amount of about 15 percent by weight, said fluoride ion concentration is about 0.75 gram-moles per liter and said ion concentration molar ratio is about 4 to 1.

21. A method of acidizing a subterranean formation containing siliceous materials to stimulate the production of desired fluids therefrom comprising contacting said formation with an aqueous acid composition having a pH value of no more than 2 and being comprised of at least one mineral acid, at least one fluoride compound which is a source of hydrofluoric acid in said mineral acid, and an aluminum compound soluble in said mineral acid which produces aluminum III ions upon dissolution in said mineral acid, wherein said fluoride compound is present in said composition in an amount sufficient to produce a fluoride ion concentration in the range of from about 0.05 to about 6 gram-moles of fluoride ion per liter of solution and said aluminum compound is present in said composition in an amount sufficient to produce an ion concentration molar ratio of said fluoride ions to said aluminum III ions in the range of from about 1 to 1 to about 6 to 1.

22. The method of claim 21 wherein said aluminum compound is selected from the group consisting of aluminum chloride, aluminum nitrate, aluminum sulfate, aluminum hydroxide, aluminum ammonium sulfate, aluminum ammonium chloride, aluminum fluoride, and mixtures thereof, the hydrates of such salts and mixtures of such salts and hydrates.

23. The method of claim 22 wherein said fluoride compound is selected from the group consisting of ammonium fluoride (NH$_4$F), ammonium bifluoride (NH$_4$F.HF), hydrogen fluoride (HF), aluminum fluoride and mixtures thereof.

24. The method of claim 23 wherein said mineral acid is selected from the group consisting of hydrochloric acid, nitric acid, sulfuric acid and mixtures thereof.

25. The method of claim 24 wherein said fluoride ion concentration is in the range of from about 0.25 to about 3 gram-moles of fluoride ion per liter and said ion concentration molar ratio is in the range of from about 2 to 1 to about 5 to 1.

26. The method of claim 25 wherein said mineral acid is present in an amount in the range of from about 0.1 to about 30 percent by weight of said composition.

27. The method of claim 26 wherein said fluoride compound and said aluminum compound is aluminum fluoride.

28. The method of claim 26 wherein said fluoride ion concentration is in the range of from about 0.5 to about 1.5 gram-moles of fluoride ion per liter and said mineral acid is present in an amount in the range of from about 5 to about 20 percent by weight.

29. The method of retarding the reaction rate of an aqueous acid composition with a siliceous material said composition having a pH value of no more than 2 and containing a mineral acid and hydrofluoric acid comprising adding to said aqueous acid composition an aluminum compound soluble in said mineral acid to produce aluminum III ions prior to reacting said composition with said siliceous material, wherein said hydrofluoric acid is present in said composition in an amount sufficient to produce a fluoride ion concentration of at least 0.05 gram-moles of fluoride per liter of solution and said aluminum compound is present in said composition to produce a molar ratio of fluoride ions to said aluminum III ions greater than 6 to 1 whereby said fluoride ion concentration is reduced by spending hydrofluoric acid by an amount sufficient to produce a molar ratio of no more than 6 to 1 at which point retardation commences and continues until the molar ratio of said fluoride ions to said aluminum III ions is about 1 to 1.

30. The method of claim 29 wherein said aluminum compound is selected from the group consisting of aluminum chloride, aluminum nitrate, aluminum sulfate, aluminum hydroxide, aluminum ammonium sulfate, aluminum ammonium chloride, aluminum fluoride, and mixtures thereof, the hydrates of such salts and mixtures of such salts and hydrates.

31. The method of claim 29 wherein said fluoride compound is selected from the group consisting of ammonium fluoride ($NH_4F$), ammonium bifluoride ($NH_4F \cdot HF$), hydrogen fluoride (HF), aluminum fluoride and mixtures thereof.

32. The method of claim 29 wherein said mineral acid is selected from the group consisting of hydrochloric acid, nitric acid, sulfuric acid and mixtures thereof.

33. The method of claim 32 wherein said mineral acid is present in an amount in the range of from about 0.1 to about 30 percent by weight of said composition.

34. The method of claim 29 wherein said aluminum compound is represented by the general formula $$(Al^{+3})_n(M^{+1})_z(X^{-a})_m$$

the hydrates of such compounds and mixtures thereof wherein: X is selected from the group consisting of anions derived from mineral acids, anions derived from organic acids, an hydroxyl group and mixtures thereof; M is selected from hydrogen and ammonium; Z is 0 or 1; and $3n+z=am$.

35. A method of acidizing a subterranean formation containing siliceous materials to stimulate the production of desired fluids therefrom comprising contacting said formation with an aqueous acid composition having a pH value of no more than 2 and being comprised of at least one mineral acid, at least one fluoride compound which is a source of hydrofluoric acid in said mineral acid, and an aluminum compound, soluble in said mineral acid, which upon dissolution in said mineral acid produces aluminum III ions, wherein said fluoride compound is present in said composition in an amount sufficient to produce a fluoride ion concentration of at least 0.05 gram-moles of fluoride per liter of solution and said compound is present in said composition to produce a molar ratio of fluoride ions to said aluminum III ions greater than 6 to 1 whereby said fluoride ion concentration is reduced by spending hydrofluoric acid by an amount sufficient to produce a molar ratio of no more than 6 to 1 at which point retardation commences and continues until the molar ratio of said fluoride ions to said aluminum III ions is about 1 to 1.

36. The method of claim 35 wherein said aluminum compound is selected from the group consisting of aluminum chloride, aluminum nitrate, aluminum sulfate, aluminum hydroxide, aluminum ammonium sulfate, aluminum ammonium chloride, aluminum fluoride, and mixtures thereof, the hydrates of such salts and mixtures of such salts and hydrates.

37. The method of claim 35 wherein said fluoride compound is selected from the group consisting of ammonium fluoride ($NH_4F$), ammonium bifluoride ($NH_4F \cdot HF$), hydrogen fluoride (HF), aluminum fluoride and mixtures thereof.

38. The method of claim 35 wherein said mineral acid is selected from the group consisting of hydrochloric acid, nitric acid, sulfuric acid and mixtures thereof.

39. The method of claim 38 wherein said mineral acid is present in an amount in the range of from about 0.1 to about 30 percent by weight of said composition.

40. The method of claim 35 wherein said aluminum compound is represented by the general formula $$(Al^{+3})_n(M^{+1})_z(X^{-a})_m$$

the hydrates of such compounds and mixtures thereof wherein: X is selected from the group consisting of anions derived from mineral acids, anions derived from organic acids, an hydroxyl group and mixtures thereof; M is selected from hydrogen and ammonium; z is 0 or 1; and $3n+z=am$.

* * * * *